(12) United States Patent
Petkov et al.

(10) Patent No.: US 10,743,089 B2
(45) Date of Patent: Aug. 11, 2020

(54) METHOD OF OPERATING A COMMUNICATION SYSTEM, AND TERMINAL FOR DETERMINING A PARAMETER

(71) Applicant: DIEHL METERING SYSTEMS GMBH, Nuremberg (DE)

(72) Inventors: Hristo Petkov, Nuremberg (DE);
Thomas Lautenbacher, Erlangen (DE);
Thomas Kauppert, Nuremberg (DE);
Klaus Gottschalk, Winkelhaid (DE)

(73) Assignee: Diehl Metering Systems GmbH, Nuremberg (DE)

( * ) Notice: Subject to any disclaimer, the term of this patent is extended or adjusted under 35 U.S.C. 154(b) by 0 days.

(21) Appl. No.: 16/234,911

(22) Filed: Dec. 28, 2018

(65) Prior Publication Data
US 2019/0281369 A1   Sep. 12, 2019

(30) Foreign Application Priority Data

Mar. 10, 2018   (DE) .......................... 10 2018 001 967

(51) Int. Cl.
*H04Q 9/00*   (2006.01)
*G08C 17/02*  (2006.01)
(Continued)

(52) U.S. Cl.
CPC ............... *H04Q 9/00* (2013.01); *G01D 4/002* (2013.01); *G01D 21/00* (2013.01); *G08C 17/02* (2013.01);
(Continued)

(58) Field of Classification Search
CPC .. H04Q 9/00; H04Q 2209/40; H04Q 2209/60; H04Q 2209/88; G01D 4/002;
(Continued)

(56) References Cited

U.S. PATENT DOCUMENTS

2001/0011032 A1 * 8/2001 Suzuki ..................... H04B 1/38
455/574
2011/0241423 A1 * 10/2011 Bridges ..................... H02J 1/00
307/31

FOREIGN PATENT DOCUMENTS

DE   102011113828 A1   3/2013
JP   2014116681 A   *   6/2014   ............. H04L 27/00
JP   2014116681 A       6/2014

* cited by examiner

*Primary Examiner* — Brian A Zimmerman
*Assistant Examiner* — Kevin Lau
(74) *Attorney, Agent, or Firm* — Laurance A. Greenberg; Werner H. Stemer; Ralph E. Locher

(57) ABSTRACT

Data are transmitted and/or received in a communication system by a communication participant, which has a communication device, a microprocessor, and an energy supply. The latter has an electrical variable that changes from an initial value when it supplies the microprocessor and/or the communication device with energy. The microprocessor encodes the data before transmission and/or decodes the data after reception, each using a computing cycle. When the electrical variable changes during the computing cycle, it is interrupted, preferably at any desired point. The encoding and/or decoding are carried out separately during the computing cycle in individual encoding phases in which the value of the electrical variable changes. Regeneration phases for regenerating the electrical variable are provided between and/or within the encoding phases. The duration of a regeneration phase is such that the value of the electrical variable approaches or reaches the initial value during the regeneration phase.

20 Claims, 7 Drawing Sheets

(51) Int. Cl.
*G01D 21/00* (2006.01)
*H04W 52/02* (2009.01)
*G01D 4/00* (2006.01)
*H04L 1/00* (2006.01)

(52) U.S. Cl.
CPC ........... *H04W 52/0261* (2013.01); *H04L 1/00* (2013.01); *H04Q 2209/40* (2013.01); *H04Q 2209/60* (2013.01); *H04Q 2209/88* (2013.01)

(58) Field of Classification Search
CPC ... G01D 21/00; G08C 17/02; H04W 52/0261; H04L 1/00
See application file for complete search history.

METHOD OF OPERATING A COMMUNICATION SYSTEM, AND TERMINAL FOR DETERMINING A PARAMETER

CROSS-REFERENCE TO RELATED APPLICATION

This application claims the priority, under 35 U.S.C. § 119, of German patent application DE 10 2018 001 967.6, filed Mar. 10, 2018; the prior application is herewith incorporated by reference in its entirety.

BACKGROUND OF THE INVENTION

Field of the Invention

The present invention relates to a method for operating a communication system, in which data are transmitted and/or received by a communication participant. The communication participant has a communication device for transmitting and/or receiving the data, a microprocessor, and an energy supply. The energy supply supplies the microprocessor and/or the communication device with energy for its operation, the energy supply has an electrical variable, the value of which changes from an initial value over the course of supplying the microprocessor and/or the communication device with energy. The microprocessor codes the data before transmission and/or decodes the data after reception, and the encoding and/or decoding is/are carried out using a computing cycle. The invention also pertains to a terminal for determining a parameter.

Intelligent consumption meters, also called smart meters, are consumption meters, for example for heat or energy, electricity, gas, water, which are incorporated in a supply network, indicate the actual consumption to the respective connection user and are incorporated in a communication network. Intelligent consumption meters have the advantage that manual readings of the meter readings are dispensed with and shorter-term invoices according to the current consumption can be effected by the supplier. As a result of shorter-term reading intervals, it is in turn possible to more accurately couple the end customer tariffs to the development of the trading prices for electricity. Supply networks can also be used in a considerably better manner.

Consumption meters of the generic type are usually each assigned to residential, commercial or industrial units. The consumption data arising there can be read in a wide variety of ways, for example via a radio connection. On account of the fact that such consumption meters sometimes have to operate autonomously over several years, that is to say capture the consumption and transmit the latter, for example by means of a radio connection, particular requirements are imposed on the energy supply for the consumption meter. A battery is usually used in this case as the energy store and, for example on account of the calibration or a required protection class of the consumption meter, is permanently installed in the consumption meter, for example is potted together with the electronics of the consumption meter using a potting compound, with the result that replacement is not possible without additional time-consuming and cost-intensive measures. Therefore, the service life of the consumption meters is generally calculated on the basis of the durability of the energy store, with the result that the further development of energy management, in particular, is at the forefront of research and development in order to extend the service life of consumption meters of the generic type.

German published patent application DE 10 2011 113 828 A1 describes a method for determining the battery condition of a battery in a battery-operated consumption capture device, for example a heat cost allocator, a water meter or a data collector which forwards data sent from a consumption meter to a central collecting point, wherein the consumption meter transmits the consumption data to the data collector at predefined intervals of time by radio. In this case, the consumption capture devices have a temporally changing, in particular pulsed, power consumption, as occurs during transmission and/or reception in the case of radio transmission of data, in particular. Different computing powers of a microprocessor contained in the device can also result in a temporally changing power consumption. In the method for determining the battery state of charge of the battery, the voltage of the battery is measured, wherein a criterion for the battery state of charge is derived therefrom. This results in the disadvantage that the battery voltage must be measured continuously or in a temporally clocked manner and additional and complicated circuit arrangements therefore need to be provided. In addition, the data are transmitted via radio without additional security measures, as a result of which problems with respect to the data transmission security may arise.

SUMMARY OF THE INVENTION

It is accordingly an object of the invention to provide a method of operating a communications system which overcomes the above-mentioned and other disadvantages of the heretofore-known devices and methods of this general type and which improves the security of the transmission of the data within the communication system and reduces the energy requirement.

With the foregoing and other objects in view there is provided, in accordance with the invention, a method of operating a communication system, in which data are transmitted and/or received by a communication participant, the communication participant including a communication device for transmitting and/or receiving the data, a microprocessor, and an energy supply for supplying the microprocessor and/or the communication device with energy for an operation thereof;

the energy supply having an electrical variable with a value that changes from an initial value over a course of supplying the microprocessor and/or the communication device with energy;

the microprocessor encoding the data before transmission and/or decoding the data after reception, and thereby carrying out the encoding and decoding using a computing cycle.

The method comprises the following steps:

in the event of a change in the electrical variable during the computing cycle, interrupting the computing cycle and subsequently continuing the computing cycle once more;

separately encoding and/or decoding during the computing cycle in individual encoding phases in which the value of the electrical variable changes;

providing regeneration phases for at least partially regenerating the electrical variable between and/or within the encoding phases; and setting a duration of a regeneration phase such that the value of the electrical variable changes toward the initial value or reaches the initial value during the regeneration phase.

In other words, in the method, data are transmitted and/or received by a communication participant. In particular, the communication system may be a communication system for transmitting sensor and/or consumption data, in which the sensor and/or consumption data and operating data are transmitted between the communication participants. The communication participants are preferably terminals which are each in the form of a sensor, a consumption meter, a data collector or the like, for example. The consumption participant or the terminal comprises a communication device for transmitting and/or receiving the data, a control and evaluation unit, a microprocessor or microcontroller and an energy supply (for example a battery or a rechargeable battery). In this case, the energy supply supplies the control and evaluation unit and the microprocessor and/or the communication device with energy for the operation thereof. The energy supply also has an electrical variable, the value of which changes from an initial value over the course of supplying the microprocessor and/or the communication device with energy, preferably in a manner substantially proportional to the supply. In this case, the microprocessor is operated in such a manner that it codes the data before transmission and/or decodes the data after reception, in which case the encoding and/or decoding is/are carried out using a computing cycle. A "computing cycle" can be understood as meaning, for example, a computing operation of the microprocessor which comprises the handling of a complete encoding or decoding task.

According to the invention, in the event of a change in the electrical variable, for example an abrupt drop, during the computing cycle, the computing cycle is interrupted, preferably at any desired point, and is continued again after at least partial regeneration of the electrical variable or the energy supply. In this case, the encoding and/or decoding is/are carried out separately during the computing cycle in individual encoding phases in which the value of the electrical variable changes, for example by virtue of the value of the electrical variable decreasing or increasing. Regeneration phases for at least partially regenerating the electrical variable are provided between and/or within the encoding phases. In this case, the duration of a regeneration phase is such that the value of the electrical variable changes toward the initial value and/or reaches the latter during the regeneration phase. This results in the advantage that a critical value of the electrical variable is not exceeded or undershot, for example. This makes it possible to prevent, for example, the voltage drop of the energy supply from falling to a critical value as energy starts to be withdrawn as a result of the operation of the microprocessor during decoding. Furthermore, the energy supply or the energy store is protected, for example by virtue of the passivation layer of the battery not being affected by an excessively large voltage drop. The durability of the energy supply and therefore of the entire device is especially improved as a result. In addition, as a result of this load management, more cost-effective energy stores can be used, thus making it possible to reduce the production costs. Surprisingly, it has been shown that the energy supply can be controlled in this case in such a manner that it operates more constantly. As a result, more accurate measurement results can be achieved, for example in the field of flow rate determination or in the measurement range since the sensors required for the measurement technology, for example, generally have a smaller measurement error and therefore a higher measurement accuracy if they are connected to a voltage supply which remains constant. The method according to the invention can be easily implemented in existing devices as a pure software solution, a firmware update or a functional assembly.

The encoding phases of the computing cycle may each comprise at least two, preferably a plurality of, partial encoding phases, that is to say the encoding and/or decoding in a encoding phase can be carried out piece by piece, wherein the coded and/or decoded sections are then combined, with the result that the result does not differ from that of an uninterrupted encoding phase. Furthermore, regeneration phases can be respectively provided between the different sections or partial encoding phases.

A threshold value of the electrical variable can be expediently stipulated, wherein a period t is derived from the threshold value and the change between the encoding phase or partial encoding phase and the regeneration phase is controlled using a timer signal. The timer signal can already be stipulated in advance, with the result that a continuous measurement of the electrical variable is not provided or carried out either. The timer is usually controlled or operated by a low-frequency oscillator, for example at 32768 Hz.

In accordance with a preferred feature of the invention, the microprocessor has a standby mode, wherein the microprocessor, or else only functional areas of the microprocessor, is/are changed to the standby mode during the regeneration phase. It is therefore possible to temporarily disconnect the microprocessor or functional areas of the microprocessor if the operation thereof is not required. This also makes it possible to additionally save energy.

The encoding and/or decoding may expediently be channel encoding and/or channel decoding, source encoding and/or source decoding, encryption and/or decryption and/or message encoding and/or message decoding. All encoding and/or decoding methods known from the prior art are also included within the scope of the invention. encoding/decoding is also understood as meaning the processing of the higher layers until the message can be completely interpreted. The decoding also expressly comprises the provision of the messages or data for the higher layers according to the ISO OSI layer model (Open Systems Interconnection Model).

The electrical variable of the energy supply is preferably the state of charge and/or voltage state of the energy supply. The voltage, the charge, the current intensity, the resistance, the power, the work, the capacitance, the frequency, the period duration, the inductance, the current density or the like can be used to determine the state of charge and/or voltage state or as the electrical variable itself. For example, an energy store, in particular a battery, can be provided as part of the energy supply, wherein the electrical variable of the energy supply is the state of charge and/or voltage state of the energy store.

Alternatively or additionally, an energy buffer, such as a capacitor, can also be provided as part of the energy supply. The electrical variable of the energy supply may therefore also be the state of charge and/or voltage state of the energy buffer.

Furthermore, a threshold value of the electrical variable can be stipulated, wherein the value of the electrical variable changes from the initial value toward the threshold value, that is to say approaches this threshold value, during the encoding phase. The threshold value is, for example, a voltage value to which the voltage of the energy supply could fall during decoding without having a negative influence on the subcomponents, for example the sensors or measurement technology.

The duration of the encoding phase can here expediently be such that the value of the electrical variable does not reach or undershoots the threshold value during the encoding phase. The durability of the energy supply is considerably improved as a result. In addition, a negative influence on subcomponents such as sensors or measurement technology is prevented.

It is particularly expedient if the encoding phases and regeneration phases are arranged periodically in alternation. This makes it possible, for example, to allow the voltage value of the energy supply to fall to a particular value during the encoding phase and to then allow this value to rise again, that is to say to regenerate, during the regeneration phase, with the result that there is respectively only a slight voltage decrease which protects the energy supply. The durability of the energy supply is also additionally improved as a result.

The data, for example the consumption and/or operating data, are preferably transmitted and received in the form of data packets.

The microprocessor can be expediently provided for the purpose of handling a plurality of tasks in addition to the encoding and/or decoding, for example the processing of events which suddenly occur, the control of the sensors or processing procedures for the determined measured values and parameters.

Furthermore, the data may contain an item of priority information which can be read by the receiver. In a practical manner, the duration of the encoding phases and/or the regeneration phases is stipulated on the basis of this priority information. For example, this priority information can be concomitantly transmitted at the start and/or end of the data packets. The microprocessor can then decide whether the data are intended to be decoded as quickly as possible or in a manner which is as energy-saving as possible, that is to say immediately and continuously or piece by piece at particular times with a low energy requirement. In this case, the data of a higher priority have shorter regeneration phases in order to be decoded more quickly. The energy supply can be loaded in an even more efficient manner as a result, thus allowing the decoding speed and/or the service life to also be additionally increased, for example. In addition, priorities can also be allocated to the respective tasks, with the result that an event which occurs abruptly, for example, is allocated a particular priority for handling.

A processing sequence of the pending tasks of the microprocessor is preferably derived on the basis of the priority information, wherein tasks of higher priority (for example the sensor measurement) are processed immediately or at least with priority over tasks of lower priority. The tasks of lower priority, for example the encoding and/or decoding in this case, are stored here in a memory, for example in the data memory of the terminal, and are processed during the next active phase or encoding phase. In this case, the encoding phase is temporally shifted by a value which is preferably calculated from the product of the handling time for the task of higher priority and the power required for this purpose.

If the microprocessor is processing, for example, another task which does not have a real-time requirement but has priority over the encoding and/or decoding and is not associated with the encoding and/or decoding, the microprocessor can expediently shift this task in terms of time in order to ensure that there is no disruption or interruption in the rhythm of the encoding phases or the encoding and/or decoding.

Furthermore, for a task which is carried out in parallel with the encoding and/or decoding task, in particular a task of higher priority, for example, it is possible to determine a requirement value of the electrical variable corresponding to the change in the electrical variable which arises as a result of the handling of the task. For example, the voltage at the energy supply during the sensor control task can be calculated, wherein the voltage drop which arises at the energy supply over the course of sensor control represents the consumption value determined for the task. Furthermore, the handling duration of the task can be determined using the timer, for example, by determining the times at which the microprocessor has started the handling of the task and at which it has concluded this (time requirement value). The consumption value of the electrical variable and the time requirement value can then be stored in a memory and can be used to calculate the electrical variable, for example the voltage of the energy supply with respect to its change over the course of handling the task. This makes it possible to determine the duration of the regeneration phases which is required for regeneration. This results in the advantage that the handling times can be easily matched to the tasks to be handled which respectively arise. The energy requirement is also additionally reduced as a result.

The communication participant preferably comprises a means for capturing consumption data. According to one preferred configuration variant, the communication participant is a consumption data capture device or a consumption meter, for example a water, electricity, gas or heat meter. Furthermore, the communication participant may also be a data collector or a data concentrator which receives and collects the data from a plurality of consumption meters via radio, for example, with the result that it can forward the data to a superordinate device, for example the control center of the supplier, at times which can be stipulated. However, other sensors, for example filling level sensors which capture the filling level of goods and/or food, for example on shelves, in refrigerators or the like, or of waste in containers or garbage cans, are also expressly included as the terminal.

According to one particular configuration of the invention, a measuring device can be provided for the purpose of determining the value of the electrical variable. This may be a voltmeter, for example, which is preferably connected to the energy supply and the measurement data of which are available to a superordinate control/evaluation unit or the microprocessor. As a result, the remaining service life of the energy supply can also be determined, for example, and can then be displayed to the user, for example, in a practical manner, for example by means of an optical or acoustic alarm.

In accordance with an added feature of the invention, the data transmitted and/or received in the narrowband range. According to a preferred configuration, the reception bandwidth of the respective measuring unit is less than 25 kHz, preferably less than 20 kHz, preferably less than 5 kHz, preferably less than 3 kHz, particularly preferably less than 2 kHz. The bandwidth can be determined, for example, according to the ETSI EN 300 220-1 V3.1.1 (as of February 2017) standard.

Furthermore, the overall processing of the encoding phase can last for longer than 20 msec, preferably longer than 50 msec, particularly preferably longer than 100 msec.

According to one preferred configuration, the duration of the individual encoding phases can be different and/or the encoding phases may comprise different receiver algorithms, for example synchronization, demodulation, decoding or the like. As a result, the microcontroller can temporarily or selectively disconnect its main or RAM (Random Access Memory) memory, in particular. The energy saving is also additionally increased as a result.

With the above and other objects in view there is also provided, in accordance with the invention, a terminal for determining a parameter, the terminal comprising:

a device for determining a parameter and generating data on a basis of the parameter;

a communication device for transmitting and/or receiving the data;

a microprocessor; and an energy supply for supplying the microprocessor and/or the communication device with energy for an operation thereof, the energy supply having an electrical variable, the value of which changes from an initial value over a course of supplying the microprocessor and/or the communication device with energy;

the microprocessor being configured to encode the data before transmission and/or to decode the data after reception, wherein encoding and/or decoding is carried out during a computing cycle;

wherein:

the microprocessor is configured, in the event of a change in the electrical variable during the computing cycle, to interrupt the computing cycle and to subsequently continue;

the encoding and/or decoding is carried out separately during the computing cycle in individual encoding phases in which the value of the electrical variable changes;

regeneration phases for at least partially regenerating the electrical variable are provided between and/or within the encoding phases; and a duration of a regeneration phase is such that the value of the electrical variable approaches the initial value or reaches the initial value during the regeneration phase.

In other words, there is also provided a terminal for determining a parameter, preferably a chemical or physical parameter, for example heat quantity, temperature, moisture, pressure, sound field variables, flow rate, volume, brightness, acceleration, voltage, current intensity, pH, ionic strength, electrochemical potential, filling level (for example filling level of liquids or solids), material condition or composition and/or the like. In this case, the terminal comprises a means for determining a parameter (for example sensor arrangement or sensors) and generating data (parameter data), a communication device for transmitting (for example consumption data, measurement data or the like) and/or receiving (for example control data, operating data or the like) the data, a microprocessor, and an energy supply. The energy supply is set up, for example, to supply the parameter determination means, the microprocessor and/or the communication device with energy for the operation thereof. The energy supply also has an electrical variable, the value of which changes, for example decreases or increases, over the course of supply. The microprocessor is used, inter alia, to code the data before transmission and/or to decode the data after reception and can be operated in such a manner that the encoding and/or decoding is/are carried out in phases in encoding phases in which the value of the electrical variable changes from an initial value. In this case, regeneration phases for at least partially regenerating the electrical variable, in which no encoding and/or decoding is/are carried out for example, are provided between the encoding phases. In this case, the duration of the regeneration phases is such that the value of the electrical variable changes toward the initial value and/or reaches the latter during the regeneration phase, for example the voltage value of the energy supply increases again to the level of the voltage value at the start of the encoding operation, that is to say increases to the value of the initial value.

The energy supply preferably comprises an energy storage device, in particular a battery, a rechargeable battery, and/or an energy buffer, for example a capacitor or a buffer capacitor. However, any energy storage devices of the generic type known from the prior art are expressly included.

According to one preferred configuration variant, the terminal may be a utility meter or a consumption meter for determining the consumption of a supply medium, which consumption meter determines the consumption as the parameter and can transmit and/or receive this in the form of consumption data via the communication system. For example, a fluid meter, for example a water, gas or heat meter, may be provided as the consumption meter.

As means for determining a parameter, the consumption meter generally comprises a device for capturing and/or determining consumption data. For example, it may be an ultrasonic transducer arrangement for determining the flow rate of a fluid. In this case, the consumption data are preferably captured on the basis of a propagation time difference measurement. The period before reaching the threshold value can be expediently determined during the energy supply, for example using an additional measuring device; in this case, the period is preferably estimated, measured and/or calculated.

Other features which are considered as characteristic for the invention are set forth in the appended claims.

Although the invention is illustrated and described herein as embodied in a method of operating a communication system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
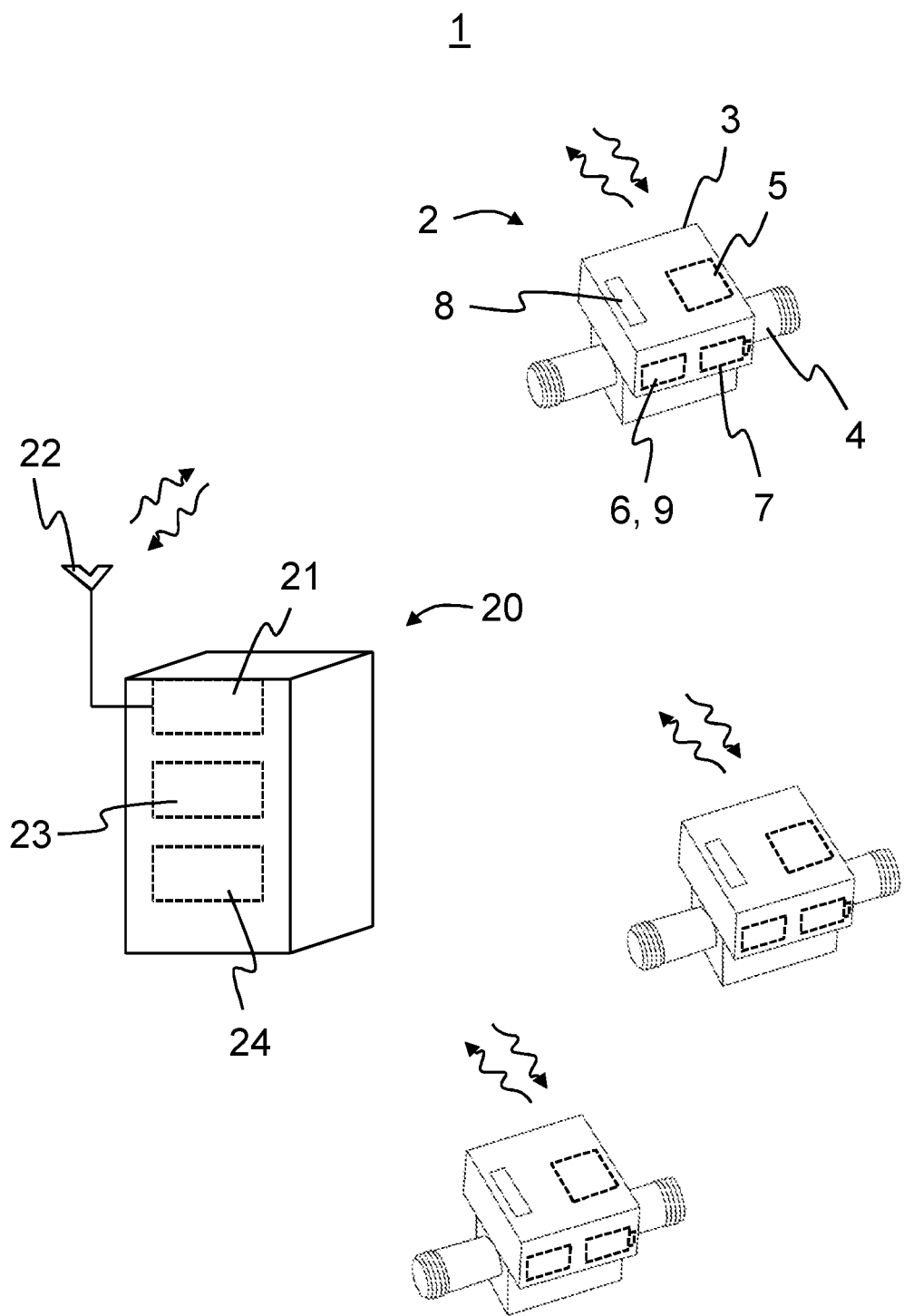
FIG. 1 shows a simplified schematic illustration of one configuration of a communication system which is operated with the method according to the invention.

Referring now to the figures of the drawing in detail and first, particularly, to FIG. 1 thereof, there is shown a communication system 1 which is operated using the method according to the invention. The communication system 1 is used to transmit data between a plurality of communication participants, that is to say a plurality of terminals, and a data collector 20. The terminals are in the form of consumption meters 2 which each determine the consumption of a supply medium (for example water, heat quantity, gas, electricity or the like) as the parameter. The data are corresponding consumption data and/or operating data which are transmitted in the form of data packets between the communication participants via radio. Depending on whether a consumption meter 2 is currently transmitting consumption data to the data collector 20 or is receiving operating data from the data collector 20, for example, the respective consumption meter 2 or the data collector 20 may be a transmitter or receiver. The data collector 20 comprises a communication module 21 with an antenna 22, a control unit 23 and a data memory 24 for collecting or storing the data. The data collector 20 can then transmit the data to a superordinate central unit which is not illustrated in the figures, for example the control center of the supplier, in a wireless or wired manner. The data collector 20 also comprises an energy supply (likewise not illustrated). This may be a grid connection or an energy store, for example a battery or a rechargeable battery.

The consumption meters 2 in FIG. 1 are in the form of fluid meters each comprising an electronic housing 3 for accommodating the electronic components. Each of the consumption meters 2 also comprises a connection housing 4 for connecting the consumption meter 2 into a supply network which is not illustrated in the figures for the sake of clarity, for example the drinking water supply of a household. The consumption meter 2 also comprises a means for determining consumption (likewise not illustrated in FIG. 1), which is used to determine the consumption of a supply medium. The determined consumption can be transmitted to the data collector 20 using a communication device 5 via radio. The consumption meter 2 also comprises a control and evaluation unit 9 for controlling the consumption meter 2, an energy supply 7 and a display 8, for example for displaying the current consumption values. The consumption meter 2 also comprises at least one microprocessor 6 which is preferably assigned to the control and evaluation unit 9. Different functions of the control and evaluation unit 9 can be carried out using such microprocessors 6. For example, the microprocessor 6 is set up to code and decode the data or data packets. In this case, the energy supply 7 is used to supply the microprocessor 6 and/or the communication device 5 and/or the display 8 and/or the means for determining consumption with energy for the operation thereof. In this case, critical states of the energy supply 7 may result, for example as a result of energy-intensive processes, for example the encoding and/or decoding of data, as a result of which a damaging voltage drop may arise at the energy supply 7.

Figure 2:
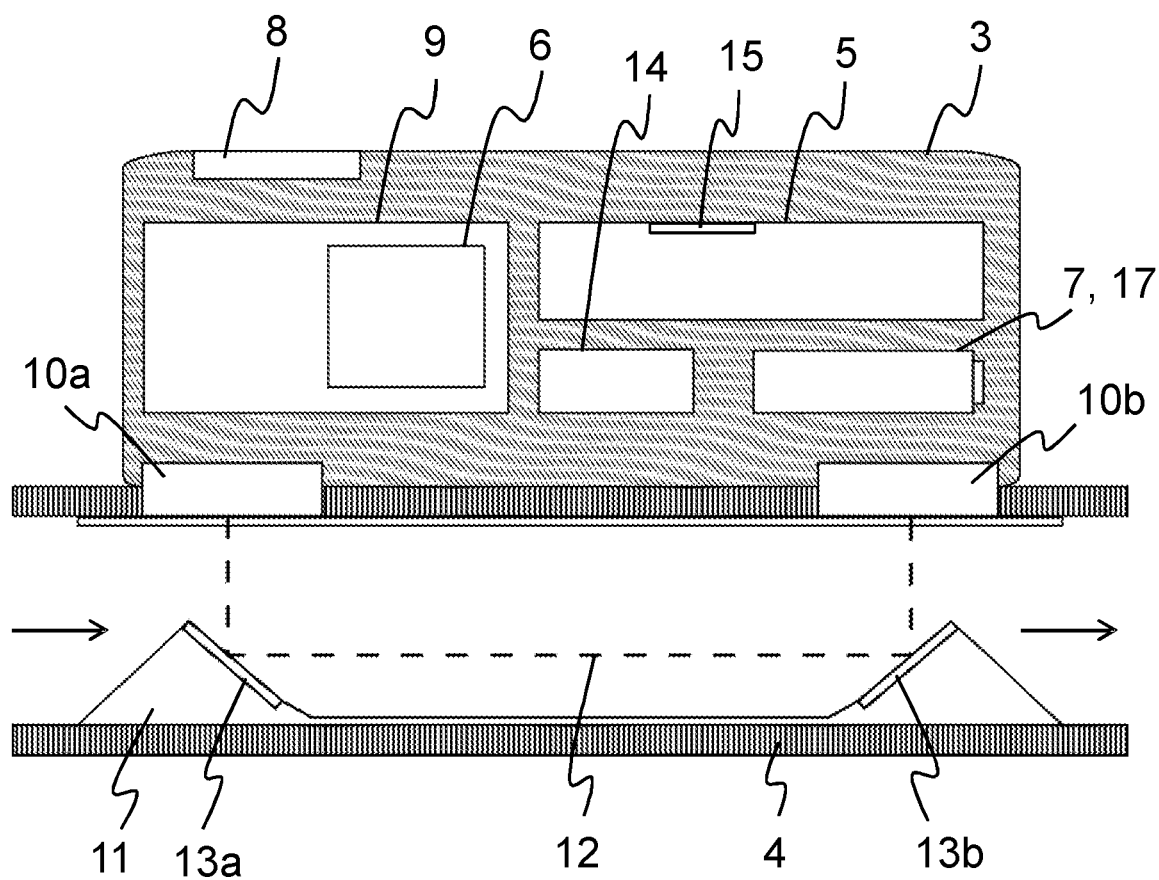
FIG. 2 shows a highly simplified schematic illustration of a consumption meter according to the invention.

FIG. 2 illustrates a simplified configuration variant of the consumption meter 2 according to the invention. The consumption meter 2 is a water meter which comprises an ultrasonic transducer arrangement as the means for determining the consumption of water. In this case, the ultrasonic transducer arrangement consists of two ultrasonic transducers 10a, 10b and a measuring insert 11 which is produced from plastic, for example, and can be easily inserted or installed in the connection housing 4 of the consumption meter 2. The measuring insert 11 also comprises two diverting devices 13a, 13b which are provided for the purpose of diverting an ultrasonic measuring section 12 between the ultrasonic transducers 10a, 10b, such that said measuring section runs in a U-shaped manner through the measuring insert 11. The direction of flow of the water is marked using arrows in FIG. 2.

According to one preferred configuration variant of the consumption meter 2, the water consumption is determined by virtue of the ultrasonic transducers 10a, 10b transmitting ultrasonic signals along the ultrasonic measuring section 12. In this case, the ultrasonic signals run in and counter to the direction of flow of the water from one ultrasonic transducer 10a to the other ultrasonic transducer 10b and vice versa. The propagation times of the ultrasonic signals in and counter to the direction of flow can then be used, for example, to determine a propagation time difference of the ultrasonic signals which is used to determine the flow rate.

As shown in FIG. 2, the microprocessor 6 may be an integral part of the control and evaluation unit 9 which is also used, inter alia, to control the ultrasonic transducers 10a, 10b (frequency selection, transmission times or the like) and to evaluate the consumption data. A data memory 14 may also be provided and is set up, for example, to store the operating and/or consumption data, with the result that said data can be transmitted to the data collector 20 at a later time via the communication device 5. For this purpose, the communication device 5 may have a preferably integrated antenna 15 for the radio transmission of the operating and/or consumption data. According to one particular configuration of the present invention, a radio chip for communication can also be integrated in the microprocessor 6.

The energy supply 7 comprises an energy storage device, for example a battery or a rechargeable battery, and has at least one electrical variable, the value of which changes in a manner that is substantially proportional to the progressing supply. According to one preferred configuration variant, the electrical voltage or residual voltage of the energy supply 7 is used as the electrical variable. It falls as consumption begins, for example during the decoding of the data packets by the microprocessor 6. However, other electrical variables of the energy supply 7, for example electrical charge, current intensity, resistance, power, work, capacitance, frequency, period duration, inductance, current density or the like, are also expressly included within the scope of the invention.

Figure 3A:
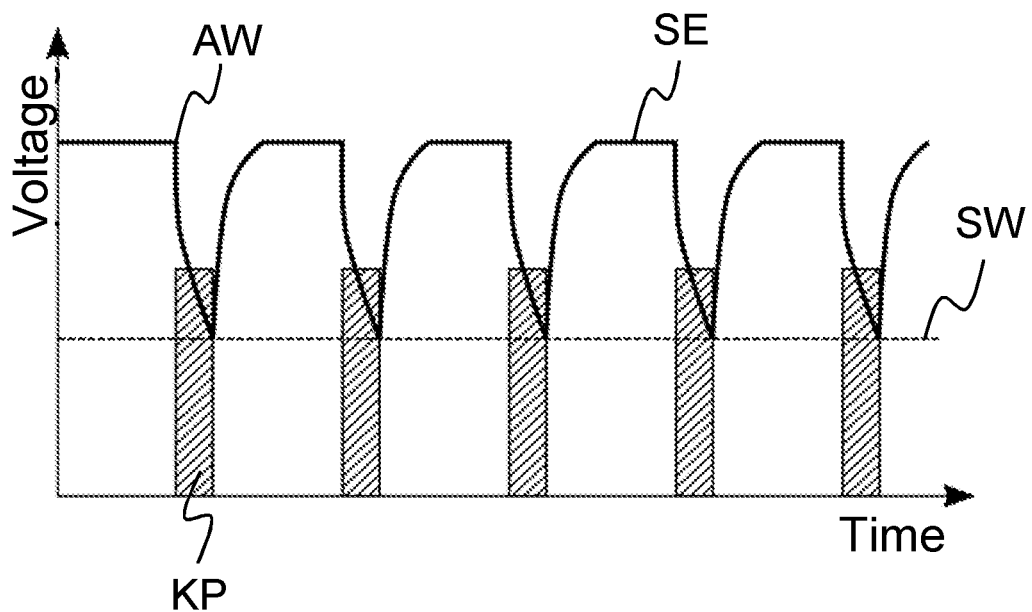
FIG. 3A shows a highly simplified illustration of the voltage curve SE of the consumption meter according to the invention.

The microprocessor 6 codes the data before transmission and/or decodes the data after reception. As shown in FIG. 3A, the encoding and/or decoding is/are carried out here in phases in so-called encoding phases KP in which the value of the electrical variable, that is to say the electrical voltage, changes, for example falls, from an initial value AW. Regeneration phases for at least partially regenerating the electrical variable are provided between the encoding phases KP. The duration of a regeneration phase is expediently such that the value of the electrical variable changes toward the initial value AW or reaches the latter again during the regeneration phase. The encoding and/or decoding is/are therefore not carried out in one go, but rather gradually, in order to protect the energy supply 7 and to not allow an excessively low voltage, that is to say regeneration pauses (regeneration phases) are placed between the respective decoding steps (coding phases). For example, this prevents the passivation layer of the battery being too greatly broken, with the result that the encoding and regeneration phases are arranged periodically in alternation. Furthermore, the regeneration phases can be so long that the actually required regeneration time is considerably exceeded, as shown in FIG. 3A, in order to also have sufficient regeneration time available in the event of unforeseeable electricity consumption, for example as a result of data transmissions which suddenly occur.

According to one preferred configuration of the invention, a threshold value SW of the electrical variable is determined on the basis of the electrical variable, wherein the value of the electrical variable changes from the initial value AW toward the threshold value SW during the encoding phase KP. The duration of the encoding phase KP in this case is such that the value of the electrical variable does not reach or undershoots the threshold value SW during the encoding phase KP. Furthermore, the initial value AW can change over the course of the service life of the energy supply, for example on account of aging and wear and tear of the energy store (for example battery), with the result that the initial value AW of the electrical voltage, for example, gradually falls from encoding phase KP to encoding phase KP.

An internal timer which is not illustrated in the figures is preferably provided and is used such that the entire microprocessor 6 or a functional group of the microprocessor 6 can be changed to a standby mode, with the result that the energy supply 7 can regenerate, that is to say the regeneration phase or the change between the encoding phase KP1-KPn and the regeneration phase is controlled using the internal timer or its timer signal. A functional group of the microprocessor 6 is, for example, the circuit part of the microprocessor 6 for controlling encoding and decoding. In this case, the internal timer may be implemented, for example, as a separately installed module, as an assembly of the control and evaluation unit 9, as a pure software application or as a functional group of the microprocessor 6.

Figure 3B:
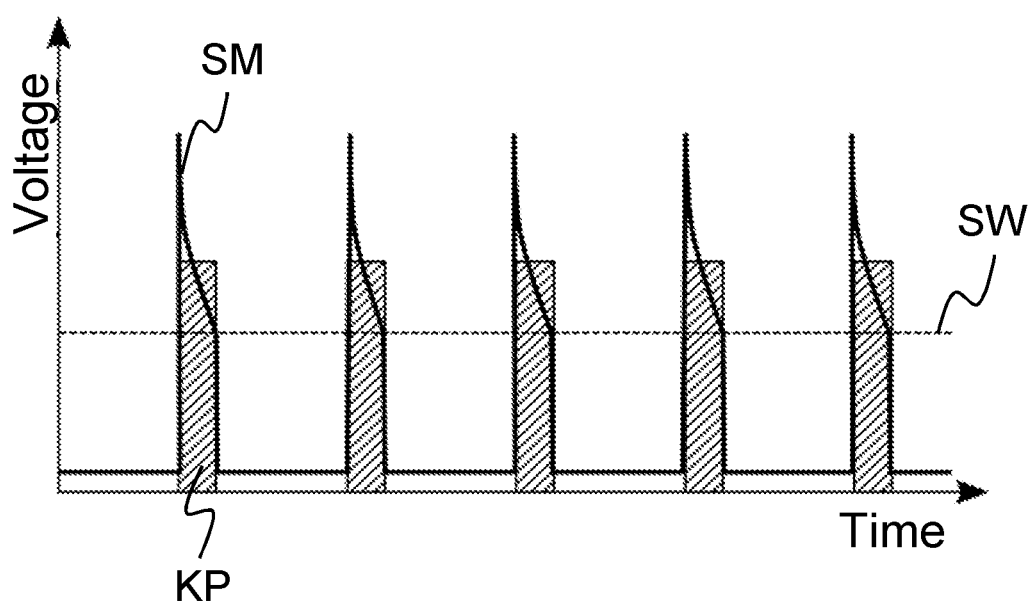
FIG. 3B shows a highly simplified illustration of the voltage curve SM of the consumption meter according to the invention.

FIG. 3A illustrates the voltage present at the energy supply 7, for example upstream of the switching device, as a voltage curve SE and FIG. 3B illustrates the voltage present at the microprocessor 6, for example downstream of the switching device, as a voltage curve SM. In this case, the voltage can be initially captured or measured or can be determined on the basis of the characteristic values of the energy store. However, a continuous voltage measurement is not required for the method sequence. For example, an abrupt voltage rise in the voltage curve SM occurs as a result of the decoding control being switched on at the start of the encoding phase KP and a rapid voltage drop in the voltage curve SE caused by the energy consumption occurs. As a result of the additional power consumption of the microprocessor 6 caused by the decoding, a voltage drop in the voltage curve SM, which is substantially similar to the voltage drop in the voltage curve SE, occurs after the initial rise in the voltage curve SM. In order to protect the energy store and allow a voltage which is not too low, the decoding is temporarily and periodically switched off here, with the result that the energy supply 7 can regenerate in interposed regeneration phases, that is to say the data packets are decoded piece by piece on the basis of the voltage value of the energy supply 7. The times of the encoding phase KP and the interposed regeneration phases are stipulated in this case so as to be able to ensure sufficient regeneration of the energy store. The aim here is to avoid producing an additional voltage dropout at the microprocessor 6 as a result of the data packets being decoded piece by piece or to avoid drawing too much energy from the energy store in one go.

Figure 4A:
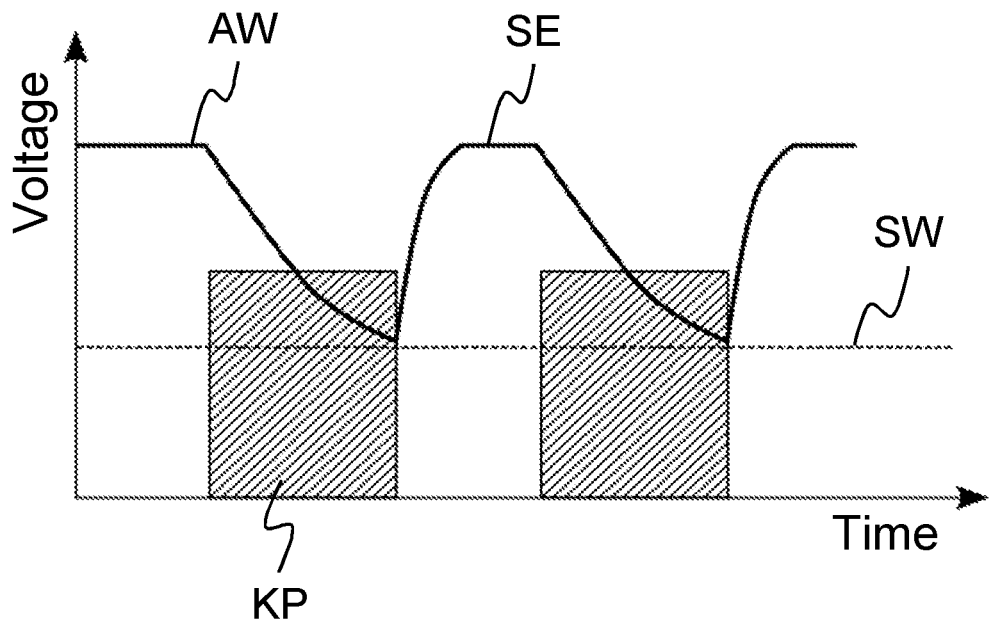
FIG. 4A shows a highly simplified illustration of the voltage curve SE of the consumption meter according to the invention with a capacitor.
Figure 4B:
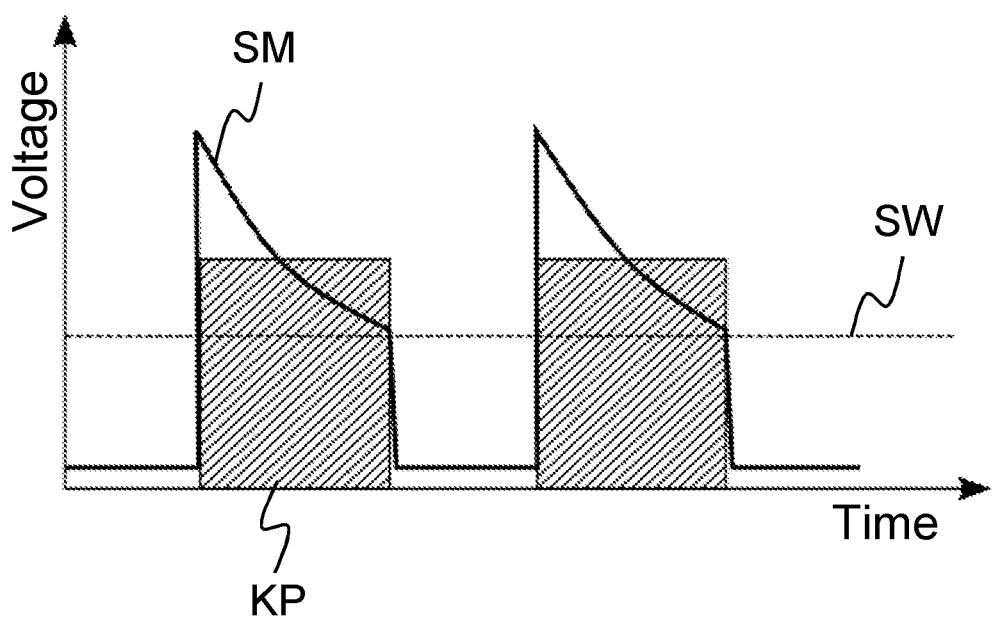
FIG. 4B shows a highly simplified illustration of the voltage curve SM of the consumption meter according to the invention with a capacitor.
Figure 5:
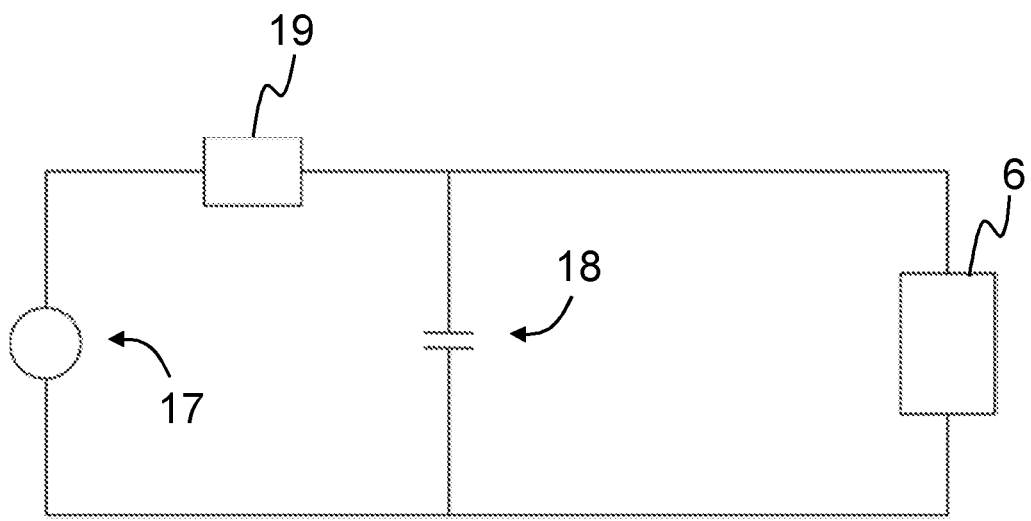
FIG. 5 shows a highly simplified illustration of one configuration of a circuit arrangement for supplying the microprocessor with energy.

Furthermore, the profile of the voltage curve SE (according to FIG. 4A) and the profile of the voltage curve SM (according to FIG. 4B) can be improved in a practical and cost-effective manner by adding an energy buffer. This makes it possible to delay the voltage drop, with the result that energy is additionally provided via the energy buffer, while the decoding is being carried out. A highly simplified circuit arrangement 16 of an energy supply 7 with a battery 17 as the energy store and with a capacitor 18 provided as the energy buffer is illustrated in FIG. 5. While no decoding is taking place via the microprocessor 6, the battery 17 and the capacitor 18 can regenerate. In contrast, the microprocessor 6 or the functional group for decoding is supplied with energy via the battery 17 and the capacitor 18 in the connected state, wherein the capacitor 18 smooths the voltage drop. The switching device for switching the decoding on and off is in or on the microprocessor 6 as a functional group in this case, which microprocessor is preferably in the form of an SMD module and is assigned to the control and evaluation unit 9.

The period t of the decoding phase, in which the threshold value SW is presumably not reached, can be expediently defined. In this case, the voltage dropout ΔV is calculated from the product of the current intensity I and the period t divided by the capacitance C of the capacitor 18. For example, the period t of the decoding could be 20 ms, with the result that a microprocessor 6 having a required current intensity of 4 mA, for example, and a capacitor of 1000 μF causes a voltage dropout of 0.08 V:

$$U(\Delta \text{ discharging})=I \cdot t/C = 4 \text{ mA} \cdot 20 \text{ ms}/1000 \text{ μF}=0.08 \text{ V}.$$

Furthermore, the voltage drop which is produced when drawing power U(after discharging) and the voltage increase during charging U(after charging) can be determined, for example, for a battery having a battery voltage (U(bat)) of 3.3 V:

$$U(\text{after discharging})=U(\text{Bat})-U(\Delta \text{ discharging})=3.3-0.08=3.22 \text{ V}$$

$$U(\text{after charging})=U(\text{after discharging})+U(\Delta \text{ discharging}) \cdot (1-e^{-t/\tau}).$$

In addition, the regeneration time t can be derived from the threshold value SW, for example, wherein the regeneration time t needed by the capacitor 18 for regeneration can be calculated on the basis of the time constant τ. The regeneration or charging of the capacitor 18 from the voltage of the battery 17 U(Bat) via a resistor 19 connected in series with the capacitor 18 is carried out exponentially. The time constant τ of the series circuit of the capacitor 18 and the resistor 19 is the product of the resistance R and the capacitance C.

$$\tau = R \cdot C$$

For example, for a battery voltage U(Bat)=3.3 V, a resistance of 2000Ω and a capacitor 18 having a capacitance of 1000 μF, a regeneration time t of 9.2 s is therefore calculated, in which regeneration time the decoding must be switched off in order to charge the capacitor 18:

$$U(\text{after charging})=0.99 U(\text{bat})$$

$$U(\Delta \text{ charging}) = U(\text{after charging}) - U(\text{after discharging})$$

$$U(\Delta \text{ charging}) = U(\Delta \text{ discharging}) \cdot (1 - e^{\wedge}(-t/\tau))$$

$$U(\Delta \text{ charging})/U(\Delta \text{ discharging}) = (1 - e^{\wedge}(-t/\tau))$$

$$e^{\wedge}(-t/\tau) = 1 - U(\Delta \text{ charging})/U(\Delta \text{ discharging})$$

$$t = -\tau \cdot \ln(1 - U(\Delta \text{ charging})/U(\Delta \text{ discharging}))$$

$$\tau = RC = 2000 \text{ ohm} \cdot 1000 \text{ µF} = 2 \text{ s}$$

$$t = -2 \cdot \ln(1 - (0.99 \cdot 0.08 \text{ V})/(0.08 \text{ V})) \text{s}$$

$$t = 9.2 \text{ s}.$$

According to one preferred configuration of the present invention, the threshold value SW can be predefined or stipulated, wherein the time constant T is determined on the basis of the threshold value SW. The timer or the timer signal can then be used to divide the encoding phases KP1-KPn and the regeneration phases, that is to say the period of the individual phases is predefined by the timer. In this case, the timer signal can be programmed in advance, can be predefined by radio or can be continuously adapted to the respective conditions in situ.

Figure 6:
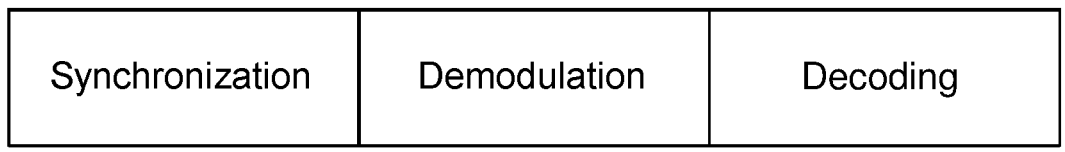
FIG. 6 shows a highly simplified illustration of one configuration of a computing operation of the microprocessor.

FIG. 6 illustrates a configuration variant of a computing operation of the microprocessor 6. In this case, the microprocessor 6 is operated in such a manner that it decodes the data after reception, wherein the decoding is carried out using a computing cycle. In this case, the computing cycle comprises the handling of a complete decoding task which, in FIG. 6, consists of the units of synchronization, demodulation and decoding, that is to say is logically assigned to the physical layer in order to set up a physical connection for transmitting the bits or data or data packets. The synchronization and demodulation are used here to preprocess the data. Furthermore, the entire computing cycle can be divided into encoding and regeneration phases within the scope of the invention.

Figure 7A:
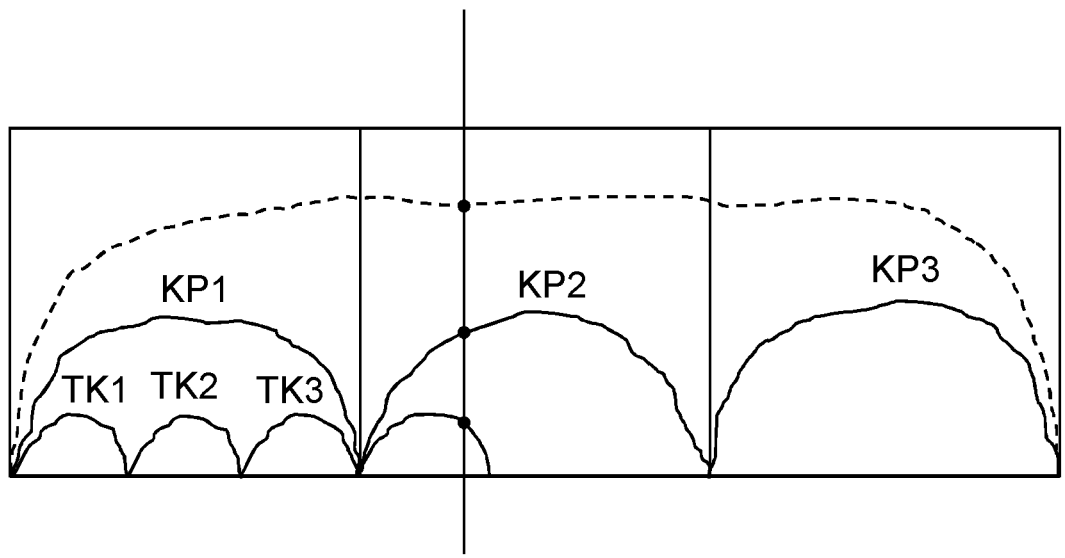
FIG. 7A shows a highly simplified illustration of a further configuration of a computing operation of the microprocessor.
Figure 7B:
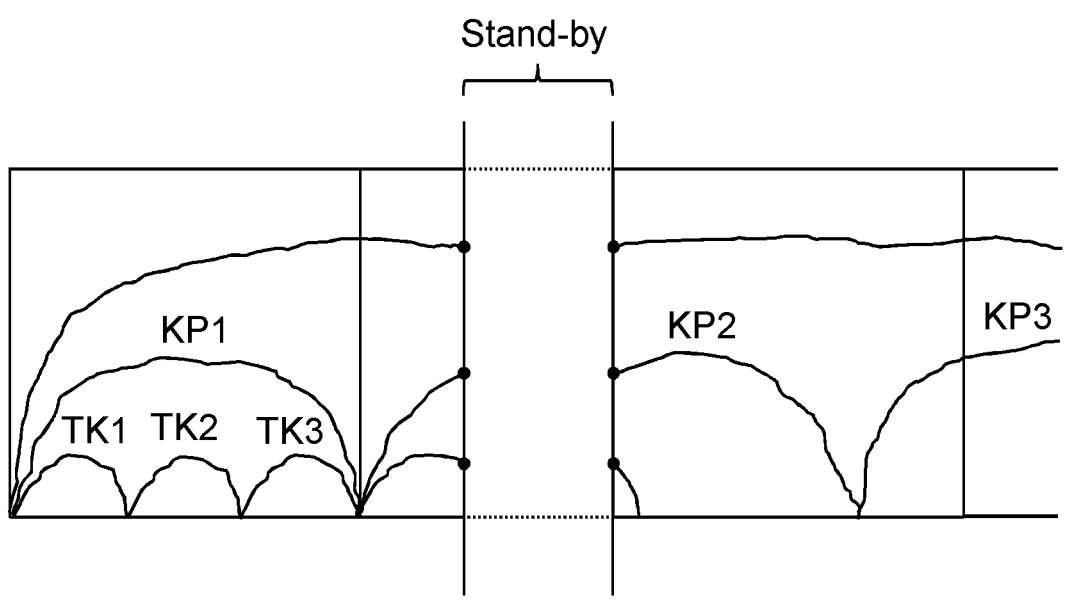
FIG. 7B shows a highly simplified illustration of a further configuration of a computing operation of the microprocessor.

FIG. 7A shows the computing operation from FIG. 6 in detail. The entire computing operation comprises the computing cycle which is illustrated as a dashed curve. The computing cycle comprises encoding phases KP1-KP3 which each represent a functional part of the entire decoding task (for example synchronization, demodulation and decoding). The encoding phases KP1-KP3 are in turn subdivided into partial encoding phases TK1-TK3, as is also schematically illustrated in FIG. 8 using the encoding phase KP1. Such partial encoding phases TK1-TK3 generally do not represent an independent functional part of the decoding task, but rather comprise only a section thereof, with the result that a encoding phase KP1-KP3 comprises at least two, preferably a plurality of, partial encoding phases TK1-TKn. For the sake of clarity, only some of the partial encoding phases TK1-TKn are illustrated in the figures. In this case, the computing cycle can be interrupted at any desired point or at a plurality of points, for example as soon as the threshold value SW is reached or exceeded. This interruption is illustrated in FIG. 7A using the vertical straight line. The interruption in FIG. 7A is arranged within the encoding phase KP2 and represents the start of a regeneration phase or the standby mode of the microprocessor 6. In this case, the duration of this regeneration phase is such that the value of the electrical variable changes toward the initial value AW during the regeneration phase and/or said initial value is reached, that is to say the energy supply is at least partially regenerated. As shown in FIG. 7B, the computing cycle is continued again at the same point after the expiry of the regeneration phase or the standby mode.

Figure 8:
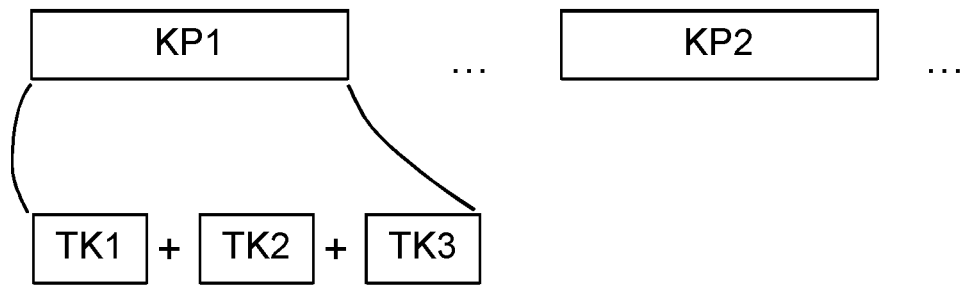
FIG. 8 shows a highly simplified illustration of successive encoding phases.
Figure 9:
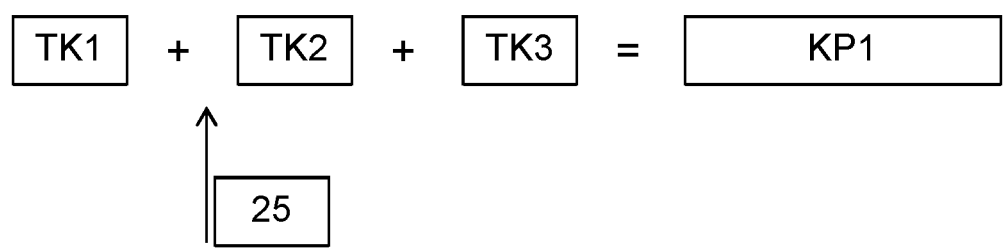
FIG. 9 shows a highly simplified illustration of successive encoding phases with an interposed event.

As shown in FIG. 8 and FIG. 9, the encoding phase KP1 is the sum of its partial encoding phases TK1-TKn, with the result that complete encoding and/or decoding is/are carried out as soon as all encoding phases KP1-KPn and their partial encoding phases TK1-TKn have been carried out in phases and the computing cycle has thus been concluded. In addition, events 25 may also be provided and are interposed in the region of the encoding phases KP1-KPn or partial encoding phases TK1-TKn. An event 25 may be, for example, an urgent task which comprises, for example, measurement processes relating to the sensors and is intended to be carried out as quickly as possible with higher priority while postponing the encoding and/or decoding.

If energy for another work step is urgently required during the decoding, for example for the sensors or means for determining consumption or for the transmission of operating data, these work steps can be prioritized using the control and evaluation unit 9 or the microprocessor 6. In a practical manner, the control and evaluation unit 9 can calculate, on the basis of the type and duration of the prioritized work step, that is to say the current or power consumption for example, how much power was consumed or by what voltage value the voltage of the battery 17 has fallen.

On the basis of this power consumption or voltage dip, the consumption meter 2 can now use the control and evaluation unit 9 to determine or calculate what regeneration time t(reg) is needed to ensure preferably complete regeneration of the capacitor 18. In a practical manner, the microprocessor 6 starts the decoding as soon as this regeneration time t(reg) has elapsed, that is to say the capacitor 18 has been charged again.

Data decoding can be prioritized in the same manner, for example when transmitting important operating and control data which are required during a firmware update, for example. For this purpose, the data or data packets may contain an item of priority information which can be read by the consumption meter 2. The handling by means of the microprocessor 6 is preferably carried out on the basis of this priority information. As a result, the microprocessor 6 can decide whether the data are intended to be decoded as quickly as possible or in a manner which is as energy-saving as possible.

In addition, at least one further capacitor which is not illustrated in the figures can be used to smooth the voltage, with the result that energy is provided via this capacitor while the energy supply 7 regenerates or the battery 17 and the capacitor 18 regenerate. As a result, abrupt voltage drops caused by the disconnection of the energy supply 7 and voltage spikes are limited or even prevented.

Combinations of individual features (subcombinations) and possible combinations of individual features of different embodiments which are not illustrated in the figures of the drawing are also expressly included in the disclosure content.

The following is a summary list of reference numerals and the corresponding structure used in the above description of the invention:

1 Communication system
2 Consumption meter
3 Electronic housing
4 Connection housing
5 Communication device
6 Microprocessor 7 Energy supply
8 Display
9 Control and evaluation unit
10a Ultrasonic transducer
10b Ultrasonic transducer
11 Measuring insert
12 Ultrasonic measuring section
13a Diverting device
13b Diverting device
14 Data memory
15 Antenna
16 Circuit arrangement
17 Battery
18 Capacitor
19 Resistor
20 Data collector
21 Communication module
22 Antenna
23 Control unit
24 Data memory
25 Event
AW Initial value
SW Threshold value
SE Energy supply voltage curve
SM Microprocessor voltage curve
KP Coding phase
TK Partial encoding phase

The invention claimed is:

1. A method of operating a communication system, in which data are transmitted and/or received by a communication participant,
    the communication participant including a communication device for transmitting and/or receiving the data, a microprocessor, and an energy supply for supplying the microprocessor and/or the communication device with energy for an operation thereof;
        the energy supply having an electrical variable with a value that changes from an initial value over a course of supplying the microprocessor and/or the communication device with energy;
        the microprocessor encoding the data before transmission and/or decoding the data after reception, and thereby carrying out the encoding and decoding using a computing cycle;
    the method comprising:
    in the event of a change in the electrical variable during the computing cycle, interrupting the computing cycle and subsequently continuing the computing cycle once more;
    separately encoding and/or decoding during the computing cycle in individual encoding phases in which the value of the electrical variable changes;
    providing regeneration phases for at least partially regenerating the electrical variable between and/or within the encoding phases; and
    setting a duration of a given regeneration phase such that the value of the electrical variable changes toward the initial value or reaches the initial value during the given regeneration phase.

2. The method according to claim 1, wherein an encoding phase comprises a plurality of partial encoding phases.

3. The method according to claim 1, wherein a threshold value of the electrical variable is stipulated, and wherein a time period t is derived from the threshold value and controlling a change between an encoding phase and a regeneration phase using a timer signal.

4. The method according to claim 1, wherein a standby mode is provided for the microprocessor and the method comprises changing the microprocessor to the standby mode during a regeneration phase.

5. The method according to claim 1, wherein the encoding and decoding is selected from the group consisting of channel encoding, channel decoding, source encoding, source decoding, encryption, decryption, message encoding and message decoding.

6. The method according to claim 1, wherein the energy supply comprises an energy storage device and the electrical variable of the energy supply is a state of charge and/or voltage state of the energy storage device.

7. The method according to claim 1, wherein the energy supply comprises an energy buffer and the electrical variable of the energy supply is a state of charge and/or voltage state of the energy buffer.

8. The method according to claim 1, which comprises setting a duration of a given encoding phase such that a value of the electrical variable does not reach or undershoots the threshold value during the given encoding phase.

9. The method according to claim 1, which comprises arranging the encoding phases and regeneration phases periodically in alternation.

10. The method according to claim 1, which comprises transmitting and receiving data in data packets.

11. The method according to claim 1, which comprises providing the microprocessor for also handling tasks in addition to the encoding and/or decoding.

12. The method according to claim 1, which comprises:
    including in the data an item of priority information and/or allocating priorities to respective tasks;
    calculating a duration of the encoding phases and/or regeneration phases on a basis of the priority information
    deriving a processing sequence of pending tasks based on the priority information, and processing tasks of a higher priority with priority; and/or
    shifting tasks of a higher priority than the encoding and/or decoding in time in order to prevent or limit disruptions or interruptions in a rhythm of the encoding phases.

13. The method according to claim 11, which comprises determining a requirement value of the electrical variable, which is needed to handle the respective task, and a time requirement value, and using the requirement value and the time requirement value to determine a duration of the regeneration phases.

14. The method according to claim 1, wherein the communication participant comprises a device for capturing consumption data.

15. The method according to claim 1, which comprises determining the value of the electrical variable with a measuring device.

16. The method according to claim 1, which comprises transmitting and/or receiving the data in a narrowband bandwidth range.

17. The method according to claim 1, which comprises processing an encoding phase to last longer than 20 msec.

18. The method according to claim 1, wherein a duration of the individual encoding phases is different and/or the individual encoding phases comprise different receiver algorithms.

19. A terminal for determining a parameter, the terminal comprising:
    a device for determining a parameter and generating data on a basis of the parameter;

a communication device for transmitting and/or receiving the data;

a microprocessor; and an energy supply for supplying said microprocessor and/or said communication device with energy for an operation thereof, said energy supply having an electrical variable, the value of which changes from an initial value over a course of supplying said microprocessor and/or said communication device with energy;

said microprocessor being configured to encode the data before transmission and/or to decode the data after reception, wherein encoding and/or decoding is carried out during a computing cycle;

wherein:

said microprocessor is configured, in the event of a change in the electrical variable during the computing cycle, to interrupt the computing cycle and to subsequently continue;

the encoding and/or decoding is carried out separately during the computing cycle in individual encoding phases in which the value of the electrical variable changes;

regeneration phases for at least partially regenerating the electrical variable are provided between and/or within the encoding phases; and a duration of a given regeneration phase is such that the value of the electrical variable approaches the initial value or reaches the initial value during the given regeneration phase.

20. The terminal according to claim 19, wherein said energy supply comprises at least one of an energy storage device or an energy buffer and/or wherein the terminal is a consumption meter which determines a consumption of a supply medium as the parameter and provides the parameter in the form of consumption data.

* * * * *